United States Patent [19]

Quick et al.

[11] Patent Number: 5,181,610
[45] Date of Patent: Jan. 26, 1993

[54] FLEXIBLE CONTAINER WITH NONSTICK INTERIOR

[75] Inventors: James R. Quick, Greenwood Lake; Robert L. Gordon, Monroe, both of N.Y.

[73] Assignee: International Paper Company, Purchase, N.Y.

[21] Appl. No.: 883,747

[22] Filed: May 15, 1992

[51] Int. Cl.$^5$ ............................. B65D 30/02
[52] U.S. Cl. .......................... 206/447; 383/107; 383/116; 383/210
[58] Field of Search ............... 383/107, 116, 210, 211; 206/447

[56] References Cited

U.S. PATENT DOCUMENTS

| | | | |
|---|---|---|---|
| 684,181 | 10/1901 | Briery | 383/107 |
| 1,107,347 | 8/1914 | Powers | 383/107 |
| 2,723,936 | 11/1955 | Ryan | 383/107 |
| 2,982,659 | 5/1961 | Mote | 383/107 |
| 2,996,238 | 8/1961 | Linde | 383/116 |
| 3,242,029 | 3/1966 | Deans . | |
| 3,314,211 | 4/1967 | Wolff | 206/447 |
| 3,374,598 | 3/1968 | Piroutek . | |
| 3,454,450 | 7/1969 | Tyrrell . | |
| 3,457,139 | 7/1969 | James . | |
| 3,471,005 | 10/1969 | Sexstone . | |
| 3,511,746 | 5/1970 | Davies . | |
| 3,596,828 | 8/1971 | Foster . | |
| 3,749,620 | 7/1973 | Montgomery . | |
| 4,539,793 | 9/1985 | Malek . | |
| 4,549,653 | 10/1985 | Lauritzen . | |
| 4,572,753 | 2/1986 | Bach . | |
| 4,647,325 | 3/1987 | Bach . | |
| 4,919,272 | 4/1990 | Kai . | |

Primary Examiner—Stephen P. Garbe
Attorney, Agent, or Firm—Michael J. Doyle; Walt Thomas Zielinski; Paul R. Juhasz

[57] ABSTRACT

A pouch for the packaging of products having a pressure sensitive adhesive thereon, such as sanitary napkins. The pouch is formed of paper of plastic film coated on one side with a layer of silicone, the pouch construction being such that the silicone coating defines the interior surfaces of the pouch. Due to the nonstick characteristic of the silicone coating, the usual protective liner for the adhesive on the packaged product can be omitted. The side seams of the pouch are formed by the application of heat or ultrasonic energy in combination with mechanical deformation of the paper or film to produce embossments in the seam areas. The side seams may be comprised of two or three layers of material. The nature of these side seams may be such that the pouch may be opened by peeling apart the seams, or the seams may be sealed so tightly that the pouch can be opened only by tearing the material.

5 Claims, 6 Drawing Sheets

FIG. 1
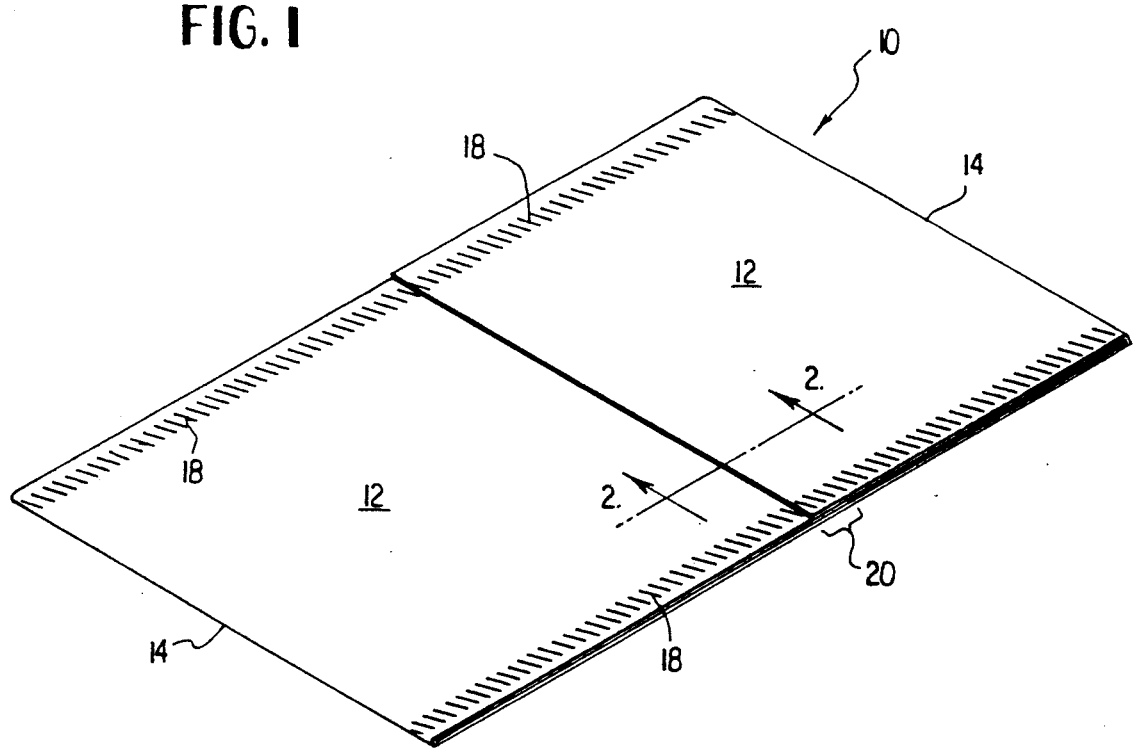
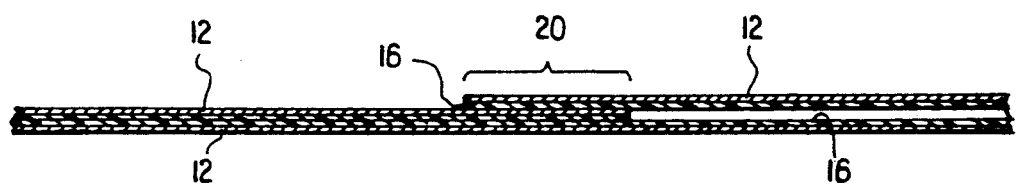
FIG. 2

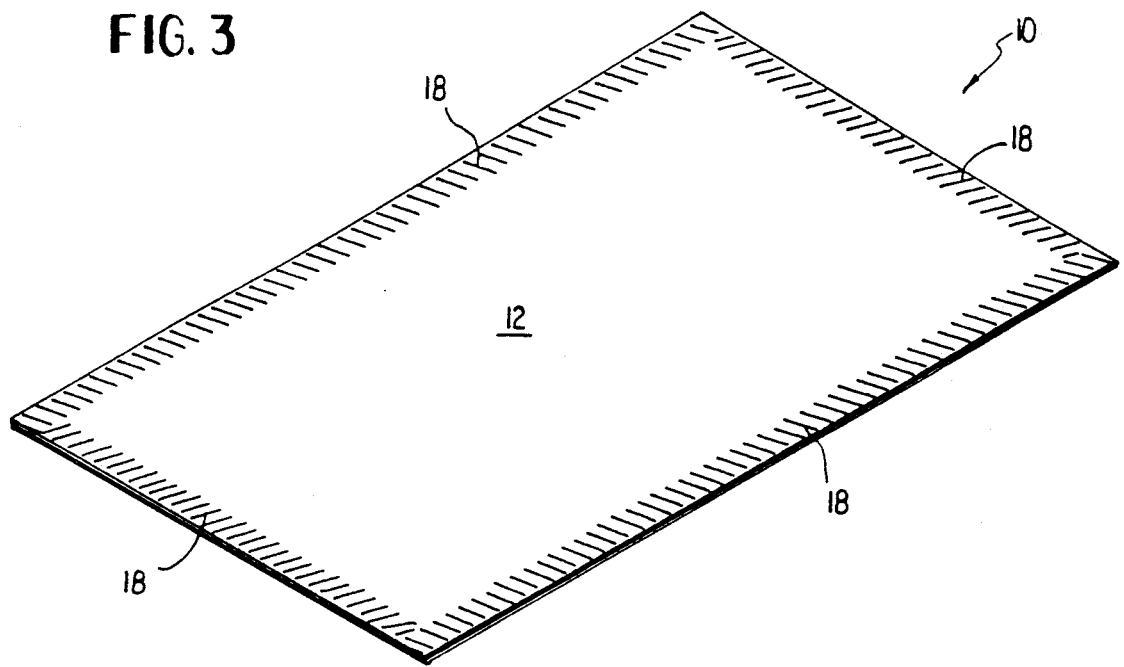
FIG. 3
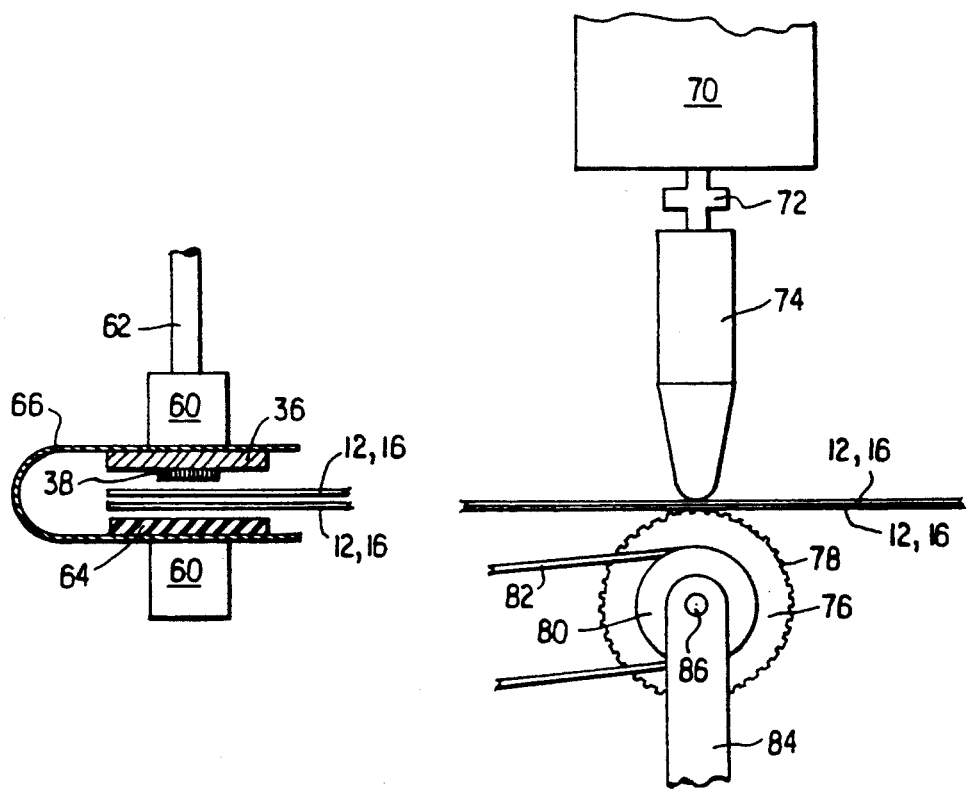
FIG. 11
FIG. 12

FIG. 8
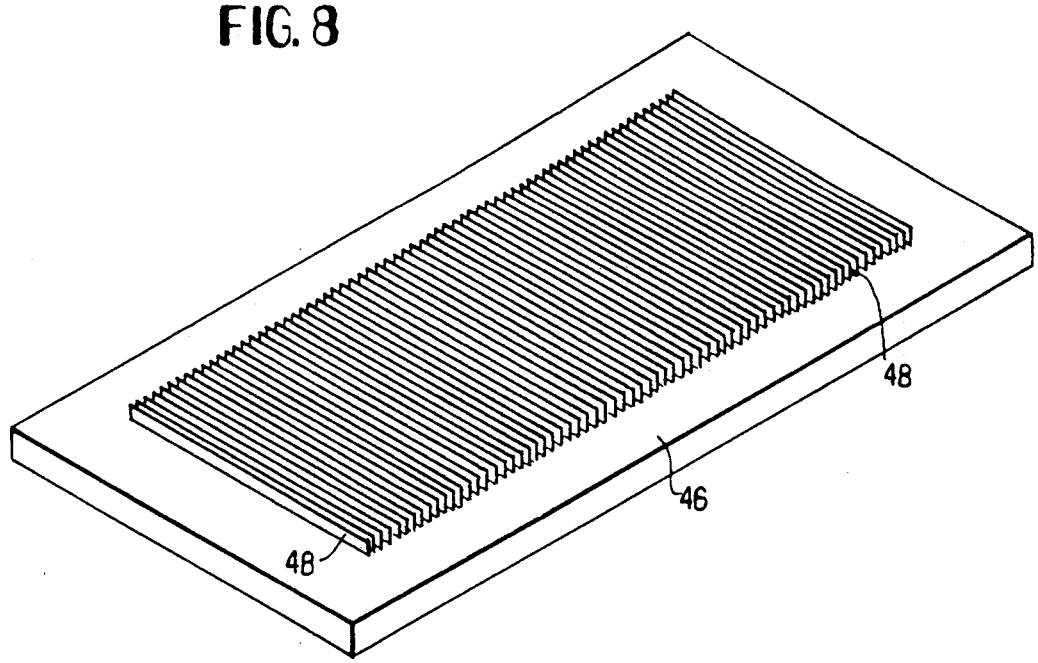
FIG. 9
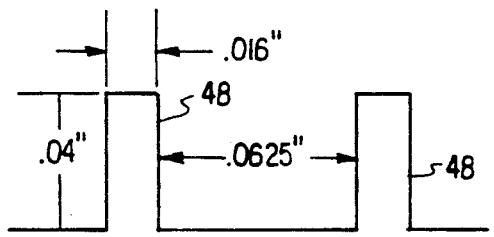
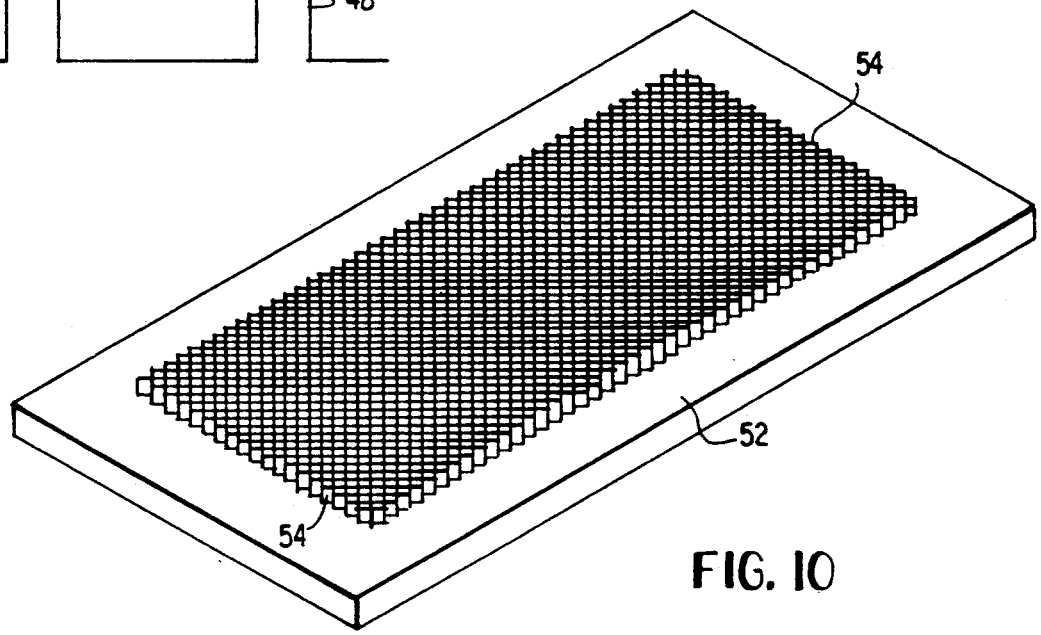
FIG. 10

FLEXIBLE CONTAINER WITH NONSTICK INTERIOR

BACKGROUND OF THE INVENTION

This invention relates to containers and more particularly to a flexible container for holding sanitary napkins or other relatively flat objects.

Sanitary napkins are often provided with a silicone-coated release liner for pressure sensitive adhesive on the sanitary napkin. The napkin with the release liner in place is packaged in a relatively small pouch. For purposes of cost reduction, packet simplification, and reduced solid waste, it would be desirable to combine the release liner and the pouch or container into a single item. For this to be accomplished, it would be necessary to form a pouch from a silicone coated paper or silicone coated plastic film. Because of the nonstick characteristic of silicone, however, it has not been known prior to this invention to form the seams of a pouch using silicone coated paper or plastic film. The prior art does not provide a method of forming flexible containers such as pouches from silicone coated paper and films and similar materials, where the design of the container is such that the seams are formed with the silicone coated surfaces facing inwards. An approach taken in the prior art involves zone coating of the silicone coating on either a paper with a sealable (thermoplastic) basecoat or on a plastic film, so that there is no silicone in those areas that will be joined to form the seams of the pouch, thereby permitting conventional heat sealing to form the seams. Although this prior art method works satisfactorily, it is complex and expensive because it not only requires zone coating of the silicone on the paper or film it also requires that the zoned pattern be held in register in the pouch-forming process.

SUMMARY OF THE INVENTION

According to the practice of this invention, a novel method is employed for the formation of flexible containers such as pouches, bags, or envelopes which have an interior surface coated with a composition which has nonstick characteristics and which lacks the thermoplastic characteristics of conventional heat sealing for forming seams by heat sealing. More specifically, the nonstick coating, as in silicone coated paper or silicone coated plastic film, is located on the interior of the pouch, with the pouch seams formed by joining the plies of material with the coated surfaces of the plies facing inward and defining the interior surface of the pouch. In this manner, the usual release liner, which covers and protects the adhesive of the sanitary napkin, is not required.

In general, the method of this invention is carried out by coating paper or plastic film with a nonstick coating, sometimes termed a release coating, such as a silicone polymer coating, then forming one or more plies of the silicone coated material into a closed pouch with the silicone coating facing inwardly of the pouch, then sealing one or more edges or edge zones of the pouch to define edge seams by a bonding process which embosses the plies of material being joined. This bonding process transmits energy to the embossed or edge seam area in the form of heat or ultrasonic vibrational energy. Silicone coated paper or plastic film is a staple item of commerce.

BRIEF DESCRIPTION OF THE DRAWINGS

FIG. 1 is a perspective view of a pouch formed in accordance with this invention.

FIG. 2 is a view taken along section 2—2 of FIG. 1.

FIG. 3 is a perspective view of another pouch formed in accordance with this invention.

FIG. 8 is a perspective view of another form of embossing plate for forming embossments for the seams of the pouch of this invention.

FIG. 9 is a cross sectional view illustrating the upper structure of the embossing plate of FIG. 8.

FIG. 10 is a perspective view of another embossing plate used to form embossments for the seams of the pouch of this invention.

FIG. 11 is a partially schematic sectional view illustrating a hot embossing plate apparatus for forming the seams of a pouch according to the invention.

FIG. 12 is a partially schematic view illustrating an ultrasonic apparatus for forming the seams of the pouch of this invention.

DETAILED DESCRIPTION OF THE INVENTION

Figure 4:
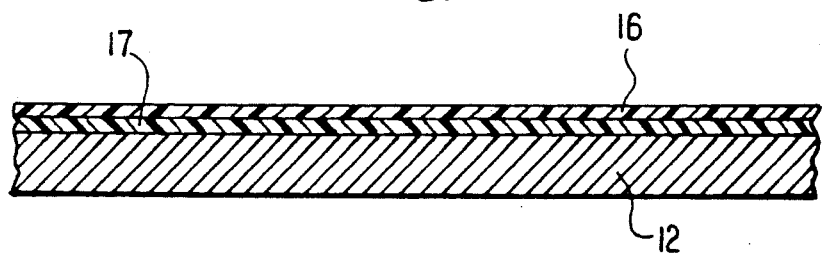
FIG. 4 is a cross sectional view illustrating one form of sheet material used to form the pouch of this invention.

Referring now to FIGS. 1 and 2 of the drawings, the numeral 10 denotes generally a pouch formed in accordance with this invention and includes a paper sheet or plastic film sheet 12 of rectangular form bent and folded as indicated to define two integral folds 14 at opposite ends thereof. The paper sheet or plastic film sheet is coated on the inwards facing surface thereof with a coating 16 of a silicone polymer. Paper or plastic film coated with a silicone polymer coating is a staple item of commerce and may be obtained from Akrosil in Menasha, Wis. The side seams of pouch 10 are designated as 18 and are defined by embossments running along and defining opposite longitudinal edge zones of the pouch. The embossments are formed on those edge zones of the pouch which are not formed by the integral folds 14. As shown at both FIGS. 1 and 2, an overlapped portion, designated as zone 20, occurs with the overlap of the right hand portion of sheet 12 over the left hand portion of the pouch. At this overlap or zone 20, the silicone coating 16 is in contact with the upper surface of paper or plastic film 12. At all other portions along both of the side seams 18, the seams are formed with the opposing or facing silicone coatings 16 in surface to surface contact.

Referring now to FIG. 3, a modified form of the pouch 10 is shown wherein two rectangular layers of sheet material are used to form the pouch. All four sides, the complete periphery of the pouch, are embossed to form seams as indicated at 18. A pouch of the form shown in FIG. 3 may be made from two layers of sheet material of differing composition, and in some cases it will be preferable to have a silicone coating on the inward facing surface of only one of the two layers of sheet material in pouch 10.

Figure 5:
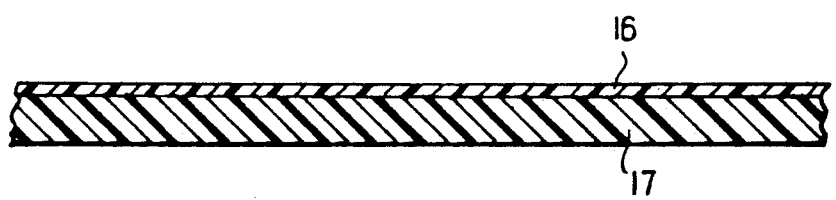
FIG. 5 is a cross sectional view of another sheet material used to form the pouch of this invention.

Referring now to FIG. 4 of the drawings, one form of the sheet material used to form the pouch of this invention is illustrated. A paper sheet 12 is coated with a base coat 17, for example a thermoplastic coating such as polyethylene, and a silicone coating 16 is applied over the polyethylene. Alternatively, as indicated at FIG. 5, the sheet material from which the pouch of this invention is formed may be defined by a plastic film 17, such as a polyethylene film, which is coated with layer 16 of silicone. Either of these two types of sheet materials and other flexible silicone coated sheet materials may be employed in carrying out the invention.

Figure 6:
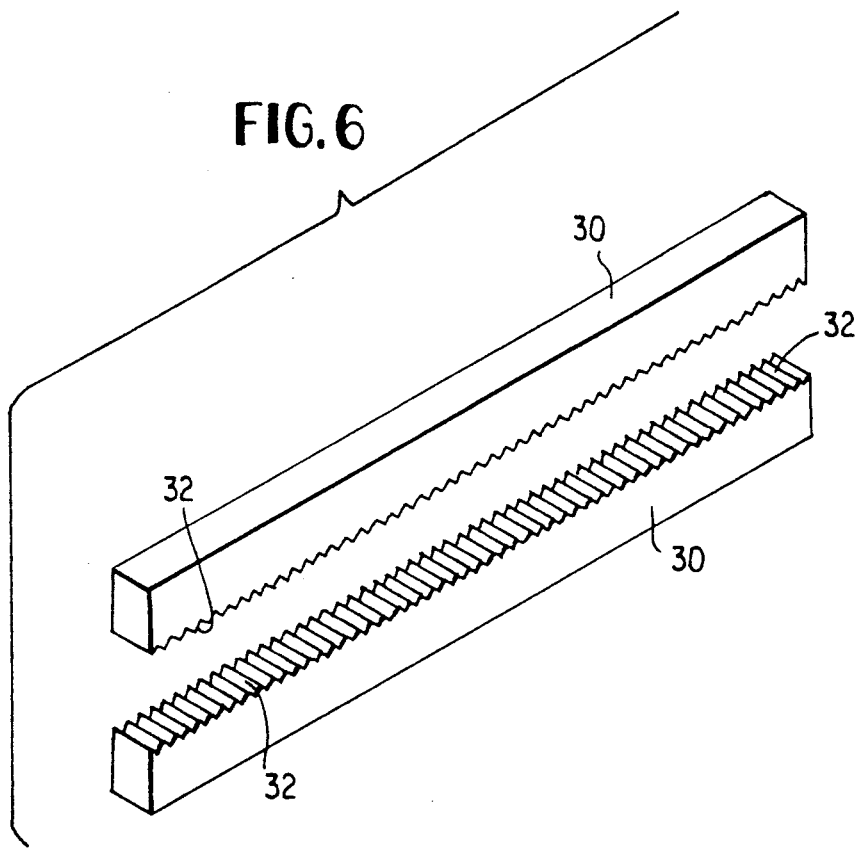
FIG. 6 is a perspective view illustrating two heated embossing bars for forming the seams of the pouch of this invention.

Referring now to FIG. 6 of the drawings, the numeral 30 designates either of two elongated, rectangular heated metal embossing bars each provided along one longitudinal surface with a plurality of serrations or teeth 32. While not illustrated, the metal bars 30 are electrically heated and are raised and lowered in respect to each other, as by hydraulic actuating elements on one of the two bars. It will be understood that such opposed heated metal bars which are moveable towards and away from each other for sealing purposes are, in general, known in the container-making art. To form the seam 18 of the pouch of this invention, the periphery to be embossed of sheets 12 of FIG. 3 or of sheet 12 of FIG. 1 is placed between the teeth 32 of the bars, and the bars are actuated to move towards each other to thereby emboss the sheet material to form one of the seams 18.

Figure 7:
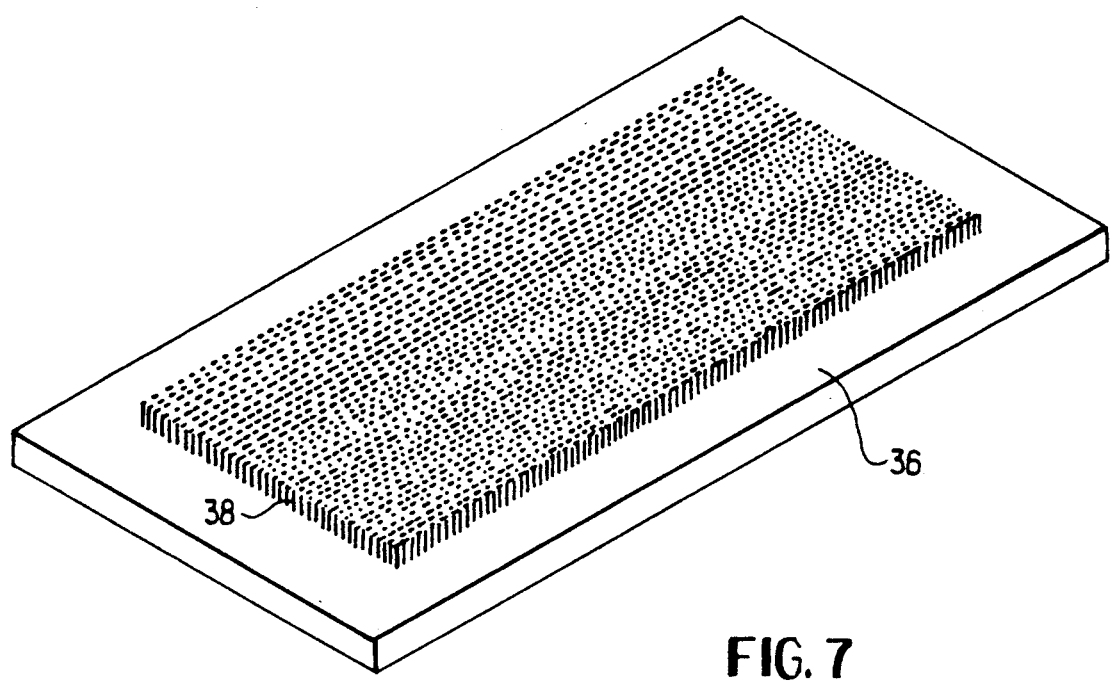
FIG. 7 is a perspective view of an embossing plate used to form embossments for the seams of the pouch of this invention.

Referring now to FIG. 7 of the drawings, a single embossing plate 36 is illustrated as having a rectangular array of integral projections 38. The dot pattern embossing plate of FIG. 7 is formed, typically, of glass fiber reinforced plastic. The use of this embossing plate will shortly be described.

Referring now to FIG. 8 of the drawings, another embossing plate is illustrated which may be described as a parallel line pattern embossing plate and is defined by a rectangular embossing plate 46, similar in material of construction and general form to that of FIG. 7, having a plurality of upstanding ridges 48. The ridges are parallel to each other and are integral with 46. FIG. 9 illustrates a typical transverse cross section, showing parallel elements 48 spaced approximately 0.0625 inches apart, having a thickness of approximately 0.016 inches and being of height of approximately 0.04 inches.

Referring now to FIG. 10 of the drawings, still another form of embossing plate is illustrated, also fashioned from the same material as described with respect to the embodiment of FIG. 7, with the plate designated as 52 and having a plurality of criss-crossed projections 54 to yield a criss-crossed pattern for seam 18.

Referring now to FIG. 11, any of the plates of FIGS. 7, 8, or 10 may be employed, with FIG. 11 illustrating the plate of FIG. 7. Each of a pair of elongated support members in the form of heated metal bars is denoted as 60, with the longitudinal axis of the support running towards the reader, perpendicular to the plane of the paper. A lifting rod 62 is actuable to raise and depress the upper bar 60 with respect to the lower bar, the latter being fixed. A rectangular rubber pad is indicated as 64, with the lower portion of pad 64 and the upper surface of embossing plate 36 secured, by an adhesive and by screws respectively, to facing surfaces of a U-shaped and preferably resilient metal member 66. Number 66 may be referred to as a metal carrier. In operation, a sheet material folded as shown in FIG. 1 or two plies of sheet material in the form shown in FIG. 3 are placed between the legs of the U-shaped metal carrier 66 and then positioned between the embossing plate 36 and rubber pad 64. It will be understood that the sheet material may be either that illustrated at FIG. 4 or at FIG. 5. With the sheet material in position, rod 62 is actuated to push upper bar 60 downwardly, so that the projections 38 on plate 36 engage, compress and deform the facing surfaces of the sheet material in the seam areas 18 as the sheet material is heated by heat transmitted from one or both metal bars 60 through embossing plate 36 and/or rubber pad 64. The reader will readily visualize that embossing plates 46 of FIG. 8 or 52 of FIG. 10 may also be employed with the apparatus of FIG. 11. As with the apparatus of FIG. 6, bars 60 are, conventionally, electrically heated, with upper bar 60 moveable by virtue of conventional actuators, such as hydraulic pistons.

Referring now to FIG. 12, an ultrasonic sewing apparatus is designated as 70, 72, and 74, with 70 designating an ultrasonic power converter, 72 denoting a power amplifier and 74 denoting an ultrasonic horn. All of these elements are conventional. The lower tip of horn 74 forms a nip with respect to a rotating anvil wheel 76, the latter preferably of a thickness approximate to the width of seam 18 which is to be formed in the pouch. The periphery of anvil wheel 76 is provided with a plurality of outwardly extending anvils or protuberances 78 having valleys or spaces between them. A pulley 80, driven by belt 82, is fixed to wheel 76 and rotates the latter. A support arm 84 having a pivot point 86 for the pulley and wheel is fixed. In operation, sheet material folded as in FIG. 1 or two plies of sheet material in the form shown in FIG. 3 are passed through the nip between anvil wheel 76 and the lower end of ultrasonic horn 74, with the sheet material translating from left to right or from right to left, depending on the direction of rotation of anvil wheel 76, to simultaneously form embossments on the seam areas 18 and transmit ultrasonic vibrational energy from horn 74 to the points of embossment. Embossed seals 18 are formed by compressing and deforming the silicone coated sheet material with localized heating due to the absorption of ultrasonic vibrational energy by the material.

Figure 13:
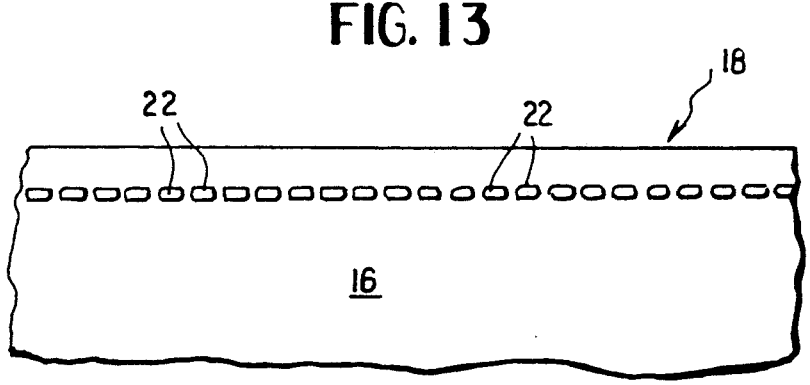
FIGS. 13 and 14 are partial plan views of two types of embossments along a portion of a seam of the pouch of this invention.
Figure 14:
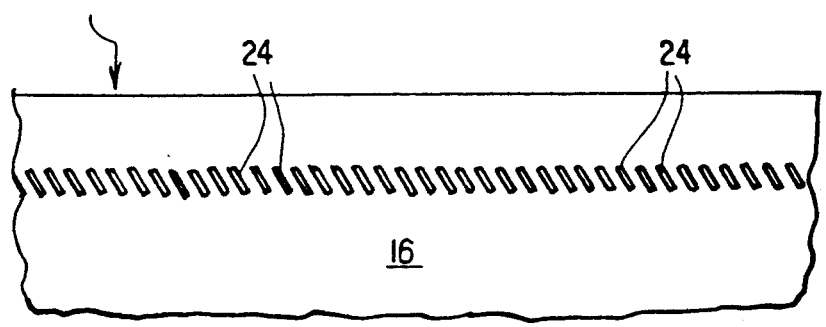

FIGS. 13 and 14 illustrate two typical embossed seams, FIG. 13 showing a pouch seam made by the apparatus of FIG. 11 with protuberances 78 of anvil wheel 76 being of a generally rectangular shape. The depressed portions of the embossments, made by protuberances 78, are denoted as 22. These depressions are deformations extending through silicone layers 16 and into the next adjacent layer or layers. In FIG. 14, the embossments are each denoted as 24 and also extend through the silicone layers 16 of the sheet material. Where there is an overlapped seam zone, such as zone 20 of FIG. 2, the embossments extend preferably through all of the silicone layers in the zone. Embossments such as 24, or 22 of FIG. 13, may be made by correspondingly shaped protuberances on anvil wheel 76. The embossments provided by the ultrasonic sewing method are commonly called stitch patterns. Embossment 22 is known as a single stitch pattern, and embossment 24 is known as a slant stitch pattern.

Figure 15:
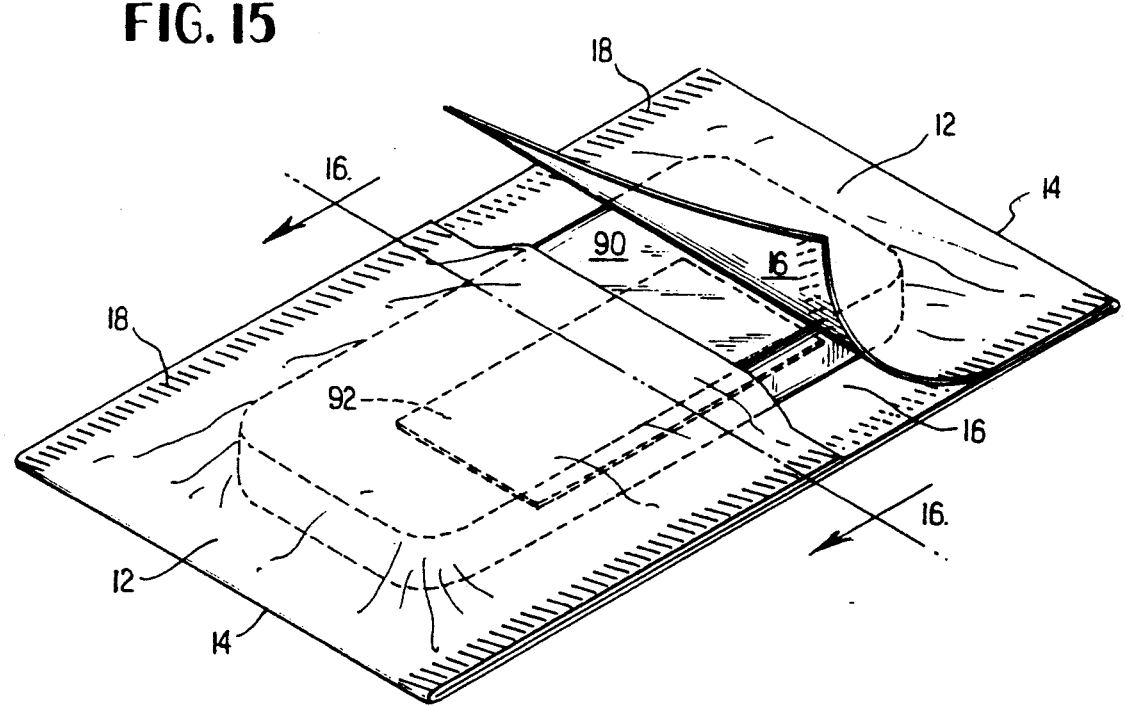
FIG. 15 is a partially schematic perspective view of the pouch of FIG. 1 partially opened, and shows a sanitary napkin in the pouch. 3
Figure 16:
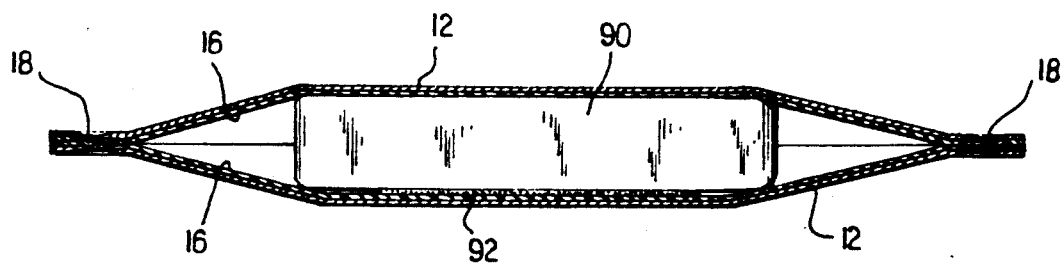
FIG. 16 is a view taken along section 16—16 of FIG. 15.

Referring now to FIG. 15, a partially schematic view of the pouch of FIG. 1 is illustrated, the pouch being partially opened. A sanitary napkin designated as 90 includes a pressure sensitive adhesive coating on its underside, the adhesive coating designated as 92. It is seen that adhesive coating 92 contacts silicone coated surface 16 of the pouch. FIG. 16 is a cross-sectional view and further illustrates the sanitary napkin having adhesive thereon and located within the pouch. The following silicone-coated materials were employed in this invention:

Film-based materials

A. 2.0 mil high-density polyethylene film silicone coated on one side

B. 2.5 mil low-density polyethylene film silicone coated on one side

C. 1.6 mil coextruded film silicone coated on one side

D. 1.0 mil polyester (PET) film silicone coated on one side

E. 2.0 mil polyester (PET) film silicone coated on one side

Paper-based materials

F. 40 lb. (basis weight*) bleached machine glazed paper, with a basecoat of 0.85 mil of high-density polyethylene on one side with a silicone coating applied over the polyethylene G. 20 lb. (basis weight*) bleached machine glazed paper, with a basecoat of 0.35 mil of low-density polyethylene on one side, with a silicone coating applied over the polyethylene H. 35 lb. (basis weight*) unbleached machine glazed paper, with basecoats of 0.75 mil of high-density polyethylene on each side, with silicone coatings applied over both polyethylene coatings I. 25 lb. (basis weight*) semi-bleached machine glazed paper, with a basecoat of polyvinyl alcohol (PVA) on one side, with a silicone coating applied over the PVA

* Basis weight is the weight of paper in 3000 sq.ft.

Heat Sealing - Equipment and Process Variables

Heat sealing tests were run on the silicone-coated materials of this study using a variety of devices to provide simultaneous embossing and heating. Four types of embossing devices were used:

1. Single embossing plates such as shown in FIGS. 7, 8, and 9 were used for one-sided embossing. For each test, an embossing plate was placed on the bottom bar of a hot bar heat sealing machine. Samples were sealed between the plate and the top bar at a specific temperature and pressure, with a short, controlled contact time. The top bar had a Teflon/fiberglass cover to prevent samples from sticking to the hot metal surface. Six embossing plates of the types shown in FIGS. 7, 8, and 9 were used in these tests. The identifications of these plates and details of the embossing patterns are as follows:

| Plate Q3809 | dot pattern as shown in FIG. 7<br>spacing between dots = .0625 inch<br>dot diameter at top = about .01 inch<br>relief (top of dot to base) = about .04 inch |
|---|---|
| Plate Q3832-1 | dot pattern as shown in FIG. 7<br>spacing between dots = .0625 inch<br>dot diameter at top = about .01 inch<br>relief (top of dot to base) = about .08 inch |
| Plate Q3832-2 | dot pattern with wider spacing than Q3809 and Q3832-1<br>spacing between dots = .125 inch<br>dot diameter at top = about .008 inch<br>relief (top of dot to base) = about .04 inch |
| Plate Q3833-3 | parallel line pattern as shown in FIGS. 8 and 9<br>spacing between lines = .0625 inch<br>line width at top = about .016 inch<br>relief (top of line to base) = about .04 inch |
| Plate Q3834-5 | criss-crossed line pattern as shown in FIG. 10<br>spacing between lines = .0625 inch<br>line width at top = about .016 inch<br>relief (top of line to base) = about .04 inch |
| Plate Q3834-6 | criss-crossed line pattern as shown in FIG. 10<br>spacing between lines = .125 inch<br>line width at top = about .016 inch<br>relief (top of line to base) = about .04 inch |

2. A second method of one-sided embossing has been described earlier and is shown in FIG. 11. This method used a single embossing plate and a rubber pad as a striking surface, both mounted in a flexible metal carrier which fit between the bars of the heat sealing machine. Samples were sealed between the plate and the rubber pad at a specific temperature and pressure, with a short, controlled contact time.

3. Mating embossing plates were used for two-sided embossing. Identical plates such as shown in FIGS. 7 and 8 were mounted on a flexible metal carrier which held the plates in position between the top and bottom bars of the heat sealing machine. Samples were sealed between the heated plates at a specific temperature and pressure, with a short, controlled contact time. Two sets of mating embossing plates were used in these tests: a pair of dot pattern embossing plates Q3832-1, and a pair of parallel line pattern embossing plates Q3833-3.

4. Pairs of heated metal embossing bars as described earlier and shown in FIG. 6 were used as a second means of two-sided embossing. Three pairs of heated metal embossing bars with different sizes of teeth were used in these tests. The identifications of these pairs of bars and details on the tooth patterns are as follows:

| Embossing bars AG-3 | teeth spaced at about .049 inch<br>tooth depth about .036 inch |
|---|---|
| Embossing bars AG-140 | teeth spaced at about .039 inch<br>tooth depth about .030 inch |
| Embossing bars AG-160 | teeth spaced at about .026 inch<br>tooth depth about .020 inch |

The ranges for the heating sealing process variables in this study were as follows:

A. The range of sealing temperatures was 115-395 F.

B. The sealing pressure was controlled via the air line pressure to the heat sealing machine. Sealing pressures, based on the total force and the contact area of the embossing plates or bars, ranged from 65 to 2200 psi.

C. Contact time was varied from 0.25 to 5 seconds.

Ultrasonic Sewing - Equipment and Process Variables

Ultrasonic sewing tests were run on silicone-coated materials using a Model F-90 ultrasonic sewing machine manufactured by Chase Machine Company of West Warwick, R.I. and Branson Sonic Power Company of Danbury, Conn. The functional components of an ultrasonic sewing machine have been described earlier and are shown in FIG. 12. The ultrasonic sewing machine employed in this invention was powered by a Branson 900B, Model 910 BC power supply. The variables in the ultrasonic sewing process and the ranges for each in this study were as follows:

Power setting on power unit - 45 to 100%.
Peripheral speed of anvil wheel was generally held constant at about 5 feet per minute.
Wheel force - 1 to 9 lb.
Stitch pattern - see below The anvil wheel of the Model F-90 ultrasonic sewing machine can be easily changed to provide different stitch patterns. Seven different wheels, all 2½ inches in diameter and of varying widths up to ⅜ inch, were used in this study. These wheels are standard items available from Branson Sonic Power Company and are listed in Tables IV and VI with Branson part numbers.

The preparation of ultrasonically sewn samples of the various materials of this study consisted of simply setting the controls on the machine to provide specific levels of ultrasonic power, wheel speed, and wheel force; and then running the samples between the ultrasonic horn and the anvil wheel.

Sample Configurations and Evaluation

Most of the tests done for this study were done with the materials folded in the trifold configuration shown in FIGS. 1 and 2, so each test involved seals with two combinations of surfaces: first the seal of the silicone-coated surface to itself, and second the seal of the silicone-coated surface to the opposite surface. The first seal corresponds to the primary seals joining the internal surfaces of a trifold pouch and the second seal corresponds to the relatively short areas where the overlap is secured along the edges of the pouch, shown as zone 20 in FIG. 2. The evaluation of sealed samples consisted of pulling the samples apart to determine the character of the seals. In the course of this work the following system of notations has been developed to designate the two types of seals in a trifold pouch configuration and to describe seal quality:

| | |
|---|---|
| 1:1 Seal = | The seal formed between the inner surfaces of the trifold configuration. |
| 1:2 Seal = | The seal formed between the inner and outer surfaces of the trifold configuration. |
| P = | Peelable seal; materials are bonded but can be pulled apart without tearing |
| T = | Tearing seal; materials are bonded and cannot be pulled apart without tearing |
| N = | No seal |

EXAMPLES 1-29

Tables I, II, and III present the results for 29 separate heat sealing tests with 4 of the materials of this study (B, C, F, and G) using the various embossing methods that have already been described. These heat sealing tests demonstrate the versatility the method that combines heat sealing with mechanical deformation of the material for the sealing of seams in pouches made from silicone coated papers and films. Variations in the embossing pattern, the type of embossing device, and the temperature, pressure and contact time allow the method to be adapted to a diversity of materials. Examples 1 and 23 show the formation of peelable seals in both parts of a trifold pouch configuration, that is the 1:1 seal and the 1:2 seal, with material B, silicone-coated low density polyethylene film. It is possible, by controlling the process variables to determine the character of the seals formed with a given material. For example, with material C, a silicone-coated coextruded film, in Examples 2, 3, 4, 16 and 24 both the 1:1 seal and the 1:2 seal are peelable seals. However, in Examples 5, 6, and 7, again with material C, neither seal is peelable and the pouch can be opened only be tearing the material. Further, in examples 25, 26, and 27 the 1:2 seals formed with material C are peelable, but the 1:1 seals can be opened only by tearing the material. The versatility of this method for forming seals with silicone-coated materials is also evident in the results for the paper-based materials F and G both of which have the silicone coating applied over a polyethylene basecoat. In Examples 8 through 15, 28 and 29, the 1:1 seals of a trifold pouch configuration are formed with materials F and G, but no 1:2 seal is obtained with the embossing devices and the process parameters of these examples. However, in Examples 17 through 22, both 1:1 and 1:2 seals are formed with paper-based materials F and G.

TABLE I

Heat Sealing of Silicone-Coated Materials Using Single Embossing Plates

| Example | Material | Embossing Device Single Embossing Plates | Temperature (F.) | Pressure (psi) | Contact Time seconds | Results 1:1 Seal | 1:2 Seal |
|---|---|---|---|---|---|---|---|
| 1 | B | Q3832-1 | 260 | 300 | 0.25 | P | P |
| 2 | C | Q3809 | 260 | 300 | 0.25 | P | P |
| 3 | C | Q3832-1 | 265 | 300 | 0.25 | P | P |
| 4 | C | Q3832-2 | 265 | 300 | 0.25 | P | P |
| 5 | C | Q3833-3 | 270 | 300 | 0.25 | T | T |
| 6 | C | Q3834-5 | 270 | 300 | 0.25 | T | T |
| 7 | C | Q3834-6 | 260 | 300 | 0.25 | T | T |
| 8 | F | Q3809 | 395 | 300 | 0.5 | P | N |
| 9 | F | Q3809 | 390 | 450 | 0.25 | P | N |
| 10 | F | Q3832-1 | 300 | 300 | 1.0 | P | N |
| 11 | F | Q3834-5 | 395 | 300 | 0.25 | P | N |
| 12 | G | Q3809 | 330 | 300 | 0.25 | P | N |
| 13 | G | Q3832-1 | 325 | 450 | 0.25 | P | N |
| 14 | G | Q3833-3 | 390 | 300 | 0.25 | T | N |
| 15 | G | Q3834-5 | 390 | 300 | 0.25 | P | N |

TABLE II

Heat Sealing of Silicone-Coated Materials Using Mating Embossing Plates or Single Embossing Plate With Rubber Pad

| Example | Material | Embossing Device | Temperature (F.) | Pressure (psi) | Contact Time seconds | Results 1:1 Seal | 1:2 Seal |
|---|---|---|---|---|---|---|---|
| | | Mating Embossing Plates | | | | | |
| 16 | C | Q3832-1 | 115 | 100 | 0.25 | P | P |
| 17 | G | Q3832-1 | 260 | 100 | 0.25 | T | T |
| 18 | G | Q3832-1 | 260 | 76 | 0.25 | T | T |
| 19 | G | Q3832-1 | 295 | 65 | 0.25 | T | T |
| 20 | G | Q3833-3 | 245 | 100 | 0.25 | T | T |
| | | Single Embossing Plate With Rubber Pad | | | | | |
| 21 | F | Q3832-1 with ⅛ in. thick rubber pad | 340 | 150 | 0.25 | T | P |
| 22 | G | Q3832-1 with ⅛ in. thick rubber pad | 225 | 150 | 0.25 | T | P |

TABLE III

Heat Sealing of Silicone-Coated Materials Using Metal Embossing Bars

| Example | Material | Embossing Device Metal Embossing Bars | Temperature (F.) | Pressure (psi) | Contact Time seconds | Results 1:1 Seal | 1:2 Seal |
|---|---|---|---|---|---|---|---|
| 23 | B | AG-3 | 125 | 700 | 0.25 | P | P |
| 24 | C | AG-3 | 120 | 700 | 0.25 | P | P |
| 25 | C | AG-3 | 205 | 700 | 0.25 | T | P |
| 26 | C | AG-140 | 205 | 1300 | 0.25 | T | P |
| 27 | C | AG-160 | 210 | 2200 | 0.25 | T | P |
| 28 | F | AG-140 | 300 | 700 | 0.25 | P | N |
| 29 | G | AG-160 | 255 | 2200 | 0.25 | P + some T | N |

EXAMPLES 30-41

Table IV presents the results for 12 separate ultrasonic sewing tests with 6 of the materials of this study (B, C, D, F, G, and I) using 7 different anvil wheel patterns. These ultrasonic sewing tests demonstrate that this method that combines the effects of ultrasonic vibrational energy with mechanical deformation of the material is suitable for the sealing of the seams in trifold pouch configurations made with a variety of paper-based and film-based silicone coated materials. Variations in the stitching pattern provided by the anvil wheel and adjustments in the other variables of the sewing process make it possible to adapt the method to the different sealing characteristics of materials B, C, D, F, G, and I. Also, the method permits control of the strength of the seal formed with a given material, as seen in Examples 30 through 36 for the film-based materials B, C, and D. The capability of this method to control the strength of the seals formed in trifold pouch configurations is also seen in Examples 37, 38, and 39 for the paper-based materials F and G. The results for material I in Examples 40 and 41 are especially noteworthy because this paper-based material does not include any thermoplastic component. Material I has the silicone coating applied over a polyvinyl alcohol coating which is not thermoplastic and consequently would generally not be considered to be a sealable coating even if the silicone coating were not present. Nonetheless, peelable seals were formed with material I, both the 1:1 and 1:2 seals of a trifold pouch configuration, as seen in Examples 40 and 41.

TABLE IV

Ultrasonic Sewing of Silicone-Coated Materials

| Example | Material | Anvil Wheel Pattern | Wheel Force (lb.) | Speed (fpm) | Power setting | Results 1:1 Seal | 1:2 Seal |
|---|---|---|---|---|---|---|---|
| 30 | B | Leaf Pattern 101-160-940 | 1 | 5 | 100% | T | T |
| 31 | B | Medium Male Knurled Pattern 101-160-968 | 1 | 5 | 75% | P | P |
| 32 | C | Flower Pattern 101-160-939 | 2 | 5 | 100% | T | T |
| 33 | C | Left Slant Switch 101-160-951 | 1 | 5 | 100% | P | P |
| 34 | C | Dot Stitch Pattern 022 | 2 | 5 | 45% | P | P |
| 35 | D | Single Stitch Pattern 101-160-911 | 9 | 5 | 100% | T | T |
| 36 | D | Medium Male Knurled Pattern 101-160-968 | 1 | 5 | 100% | P | P |
| 37 | F | Medium Male Knurled Pattern 101-160-968 | 7 | 5 | 100% | P | N |
| 38 | F | Zigzag, Split Pattern 101-160-925 | 9 | 5 | 100% | T | P |
| 39 | G | Dot Stitch Pattern 022 | 9 | 5 | 50% | P | P |
| 40 | I | Single Stitch Pattern 101-160-911 | 7 | 5 | 100% | P | P |

TABLE IV-continued

| | | Ultrasonic Sewing of Silicone-Coated Materials | | | | | |
|---|---|---|---|---|---|---|---|
| | | | Wheel Force | Speed | Power | Results | |
| Example | Material | Anvil Wheel Pattern | (lb.) | (fpm) | setting | 1:1 Seal | 1:2 Seal |
| 41 | 1 | Dot Stitch Pattern 022 | 9 | 5 | 50% | P | P |

EXAMPLES 42-46

Heat sealing tests were conducted on materials A, D, E, H, and I to determine whether the primary seal (1:1) of a trifold construction or the two ply seal of pouch 10 shown in FIG. 3 could be made using a single embossing plate, specifically embossing plate Q3809. For these tests the contact time was increased to 5 seconds. Otherwise the procedure was the same as for Examples 1-29. The results of these 5 second sealing tests are presented in Table V. Example 42 demonstrates that this method of heat sealing using a simple dot pattern embossing plate will provide peelable seals with a silicone coated high density polyethylene film material A. Examples 43 and 44 with silicone-coated polyester films, materials D and E, show that these materials are not sealable by this particular method. Example 45, shows that strong seals which can be opened only by tearing the material can be formed with material H by this method. Material H differs from the other material in this study in that it has a silicone coating on both sides, with polyethylene coatings applied on both sides of the paper as basecoats for the silicone coatings. The test of Example 45 involved only one side of material H. Example 46, with material I, like the earlier Example 40 and 41, demonstrates that a silicone coated paper-based material with a nonthermoplastic polyvinyl alcohol basecoat under the silicone can be sealed by a method that combines a localized, concentrated impingement of energy upon the material with mechanical deformation of the material, in this case forming a weak peelable seal.

TABLE V

| | | Heat Sealing of Silicone-Coated Materials Using A Single Embossing Plate | | | | | |
|---|---|---|---|---|---|---|---|
| | | Embossing Device | Temperature | Pressure | Contact Time | Results | |
| Example | Material | Single Embossing Plate | (F.) | (psi) | seconds | 1:1 Seal | 1:2 Seal |
| 42 | A | Q3809 | 300 | 300 | 5 | P | Not Tested |
| 43 | D | Q3809 | 400 | 300 | 5 | N | Not Tested |
| 44 | E | Q3809 | 400 | 300 | 5 | N | Not Tested |
| 45 | H | Q3809 | 300 | 300 | 5 | T | Not Tested |
| 46 | I | Q3809 | 400 | 300 | 5 | P (weak) | Not Tested |

EXAMPLES 47-49

Ultrasonic sewing tests were conducted on materials A, E, and H to determine whether the primary seal of a trifold configuration or the two ply seal of pouch 10 shown in FIG. 3 could be made using the standard single stitch pattern. For these tests the upward force on the anvil wheel was not determined and the speed was varied over a range of 5-10 feet per minute. Otherwise the procedure was the same as for Examples 30-41. The results of these tests on materials A, E, and H are presented in Table VI. Example 47, with silicone coated high density polyethylene film, material A, demonstrates that the ultrasonic sewing method can be used to form tight, material-tearing seals with this type of material. Example 48 is in agreement with Example 35 which also shows that strong, nonpeelable seals can be formed with a silicone coated polyester film by ultrasonic sewing with a single stitch pattern. Example 49 shows peelable seals formed by ultrasonic sewing with paper-based material H which has silicone applied over polyethylene on both sides.

TABLE VI

| | | Ultrasonic Sewing of Silicone-Coated Materials | | | | | |
|---|---|---|---|---|---|---|---|
| | | | Wheel Force | Speed | Power | Results | |
| Example | Material | Anvil Wheel Pattern | (lb.) | (fpm) | setting | 1:1 Seal | 1:2 Seal |
| 47 | A | Single Stitch Pattern 101-160-911 | — | 5-10 | 100% | T | Not Tested |
| 48 | E | Single Stitch Pattern 101-160-911 | — | 5-10 | 100% | T | Not Tested |
| 49 | H | Single Stitch Pattern 101-160-911 | — | 5-10 | 100% | P | Not Tested |

EXAMPLES 50-57

For comparison with the results of Examples 1-49, standard hot bar heat sealing tests were conducted with materials A through F, H and I. These tests included only the evaluation of the sealability of the silicone-coated side of the material to itself, i.e. the primary seal in a trifold configuration. These tests were conducted with a standard hot bar heat sealing machine with two flat bars both covered with Teflon-coated glass fabric to prevent the samples from sticking to the hot bars. In an attempt to form seals via this method the temperature was progressively increased for each material to at least 350 F. With some of the film-based materials it was not possible to extend the test to 350 F because the films were completely melted at lower temperatures. The results of these tests are presented in Table VII. None of the materials showed any degree of sealability using the standard hot bar sealing method. These results are not surprising since it is well known that silicone coated papers and films are not sealable by the methods of the prior art. The categorical difference between the results of the tests of Examples 50–57 and the results of the earlier examples confirms that the present invention is a total departure from the prior art concerning pouches made from silicone coated materials.

TABLE VII

Attempted Heat Sealing of Silicone-Coated Materials By Standard Hot Bar Heat Sealing

| Example | Material | Embossing Device | Temperature (F.) | Pressure (psi) | Contact Time seconds | Results 1:1 Seal | 1:2 Seal |
|---|---|---|---|---|---|---|---|
| 50 | A | None | 350 | 75 | 5 | N | Not Tested |
| 51 | B | None | 300 | 75 | 5 | N | Not Tested |
| 52 | C | None | 300 | 75 | 5 | N | Not Tested |
| 53 | D | None | 400 | 75 | 5 | N | Not Tested |
| 54 | E | None | 400 | 75 | 5 | N | Not Tested |
| 55 | F | None | 350 | 75 | 5 | N | Not Tested |
| 56 | H | None | 400 | 75 | 5 | N | Not Tested |
| 57 | I | None | 400 | 75 | 5 | N | Not Tested |

The examples that have been presented show that the method of this invention for sealing the seams in pouches made from silicone coated papers and films has a high degree of versatility in terms of the composition of the pouch materials. A wide-variety of silicone coated materials of other compositions different than those that have been discussed could be used to form pouches by the methods of this invention. It is to be understood that the scope of this invention is not limited to the materials used in the examples. Other materials to which the methods of this invention may be applied to form pouches will be obvious to those skilled in the art of flexible packaging materials. Examples of possible alternative silicone coated paper-based materials include the following: silicone-coated papers comprised of thermoplastic fibers such as polyethylene fibers, silicone-coated papers with the silicone coating applied over a polyester (PET) basecoat, silicone-coated papers with the silicone coating applied to a film such as a polypropylene film laminated to the paper, and silicone coated papers with the silicone coating applied on one side of a paper having a basecoat such as polyethylene on both sides. Examples of alternative film-based materials that could be used in the practice of this invention include the following: silicone coated polypropylene film, silicone coated nylon film, and silicone coated water soluble films such as poly(ethylene oxide) film. Other flexible materials related to papers and films may be used as the basestocks to which silicone coatings are applied to provide sheets for forming pouches by the methods of this invention, including but not limited to woven and nonwoven fabrics, thin sheets of flexible plastic foam, cellophane and aluminum foil, any of which may include a coating or lamination applied to the sheet prior to silicone coating to provide a smooth base for the silicone coating.

Although this invention is particularly concerned with pouches made from materials having silicone coatings that cover the full area of the inward facing surface, it may be desirable in some cases to use materials that have only partial coverage of the inward facing surface by the silicone coating. For example, to provide selective adherence of the contained product to some portion of the pouch material, the silicone coating may be omitted from predetermined areas of the material. Also, it may be preferable in some cases to have a non-peelable seal in a specific seam area of a pouch that otherwise has peelable seals. This could be accomplished by providing a silicone-free area for the non-peelable seal.

Of course the possible applications of the concepts of this invention are not limited to specific pouch designs. In addition to the designs shown in FIG. 1 and 3, pouches of other designs may be formed from flexible silicone coated materials in the manner provided by this invention. For example, pouches of nonrectangular shape, pouches with seams that are not coincident with the edges of the pouch, and pouches with more than one separate internal space for the product are all within the scope of this invention. More generally, all designs of packages formed from flexible silicone coated materials that might be classified as pouches, bags, envelopes, or similar containers are within the province of this invention.

The examples that have been presented show that a diversity of devices and apparatus can be used to practice the method of this invention to seal the seams of pouches made from silicone coated sheet materials, wherein the silicone coating is on an inside surface of the pouch. However, it is to be understood that the specific devices and apparatus described thus far are only examples of a far broader range of possibilities. Many other means of providing the essential features of the sealing method of this invention will be apparent to those skilled in the art of sealing plastic films, coated papers and related materials. For example, instead of the embossing device utilizing heated metal bars with mating teeth, as shown in FIG. 6, one could use a pair of mating, rotating, heated gear wheels to provide a continuous sealing apparatus suitable for high speed production. Conversely, instead of the dynamic ultrasonic sewing process of FIG. 17, one could use a simple reciprocating ultrasonic sealing machine which would have one or more stationary anvils, each with a reciprocating ultrasonic horn, with each anvil/horn combination sized to provide the seal along one edge of a pouch.

The sealing method of this invention requires the simultaneous effects of energy absorption by the silicone-coated material being sealed and mechanical deformation of the material. In the examples that have been presented, two methods of delivering energy to the seal area have been used, direct heating and the impinging of ultrasonic vibrational energy upon the material. Other means of providing the energy component of the sealing process are within the scope of this invention. For example, with silicone coated sheets based on materials that are responsive to induction heating, the sealing process could be based on the combination of induction heating and embossing. Similarly, with materials that are responsive to radio frequency sealing, the sealing process could use this mode of energy input, again combined with mechanical deformation of the material.

The method that has been described by way of examples and explanatory material for sealing the seams in pouches made from silicone-coated materials provides a means for producing pouches and similar packages of a form not previously possible. The essential difference between the pouches of the current invention and those of the prior art is that it is now possible to produce pouches with silicone coatings covering one or more internal surfaces of the pouch with the silicone coating extending into the seam areas of the pouch. Thus it is not necessary to follow the practice of the prior art wherein silicone coatings were applied to pouch materials in zones so as to leave uncoated areas that could be heat sealed. Based on the demonstrated utility and versatility of the subject method and the products produced thereby, we make the following claims concerning the essential aspects of the scope of our invention.

We claim:

1. A pouch for the packaging of products having a pressure sensitive adhesive thereon, the pouch formed of at least one sheet having a silicone coating on a surface thereof, said silicone coating covering at least a portion of the interior surfaces of the pouch, the pouch having at least one edge seam which at least partially surrounds the interior of the pouch, said seam including the lamination of two overlapped edge zones, at least one said overlapped edge zone having a silicone coating, said edge seam including a plurality of discrete embossments, said embossments deforming both of said overlapped edge zones.

2. The pouch of claim 1 wherein said at least one sheet is paper.

3. The pouch of claim 1 wherein said at least one sheet is film.

4. The pouch of claim 1 wherein each said overlapped edge zone has a silicone coating, said silicone coatings facing and contacting each other.

5. The pouch of claim 1 containing a product having a pressure sensitive adhesive thereon, the pressure sensitive adhesive of said product facing and being in contact with a portion of said silicone coating, whereby a separate, removable, and disposable protective layer for the adhesive is not required.

* * * * *